United States Patent
Sawyer et al.

[15] 3,673,083
[45] June 27, 1972

[54] SEWAGE TREATMENT

[72] Inventors: Roy D. Sawyer, Toledo; John D. Tinsley, Lima, both of Ohio

[73] Assignee: Nalco Chemical Company, Chicago, Ill.

[22] Filed: Dec. 28, 1970

[21] Appl. No.: 101,762

Related U.S. Application Data

[63] Continuation-in-part of Ser. No. 823,518, May 9, 1969, abandoned.

[52] U.S. Cl.................................................210/18, 210/53
[51] Int. Cl.................................................C02c 1/40
[58] Field of Search..........................................210/51–54, 18

[56] References Cited

UNITED STATES PATENTS

| | | | |
|---|---|---|---|
| 3,506,570 | 4/1970 | Wukasch | 210/53 |
| 3,617,542 | 11/1971 | Boehler et al. | 210/53 X |
| 3,480,144 | 11/1969 | Barth et al. | 210/18 X |
| 3,423,309 | 1/1969 | Albertson | 210/18 X |
| 3,461,067 | 8/1969 | Matsumoto et al. | 210/47 |
| 3,232,793 | 2/1966 | Bourne et al. | 210/52 X |
| 2,820,758 | 1/1958 | Rankin | 210/4 |
| 3,386,911 | 6/1968 | Albertson | 210/5 X |

FOREIGN PATENTS OR APPLICATIONS

| | | | |
|---|---|---|---|
| 826,770 | 1/1960 | Great Britain | 210/52 |

OTHER PUBLICATIONS

Popel, Abstract Appearing on page 988 of Journal WPCF, June 1968, Vol. 40, pp. 988 and 1004 relied on.

Nesbitt, J. B., Phosphorus Removal–The State of the Art, Journal WPCF, May 1969, Vol. 41, pp. 701–713.

*Primary Examiner*—Michael Rogers
*Attorney*—Kinzer, Dorn & Zickert, John G. Premo, Charles W. Connors and Edward A. Ptacek

[57] ABSTRACT

Soluble phosphates are removed from a sewage effluent by controlled additions of sodium aluminate, $NaAlD_2$, and a flocculant introduced into the sewage effluent at some point after secondary (aeration) treatment and prior to discharging the effluent to a receiving body of water, thereby reducing considerably the amount of phosphates responsible for proliferation of primitive aquatic plant life deemed ecologically inimical.

3 Claims, 1 Drawing Figure

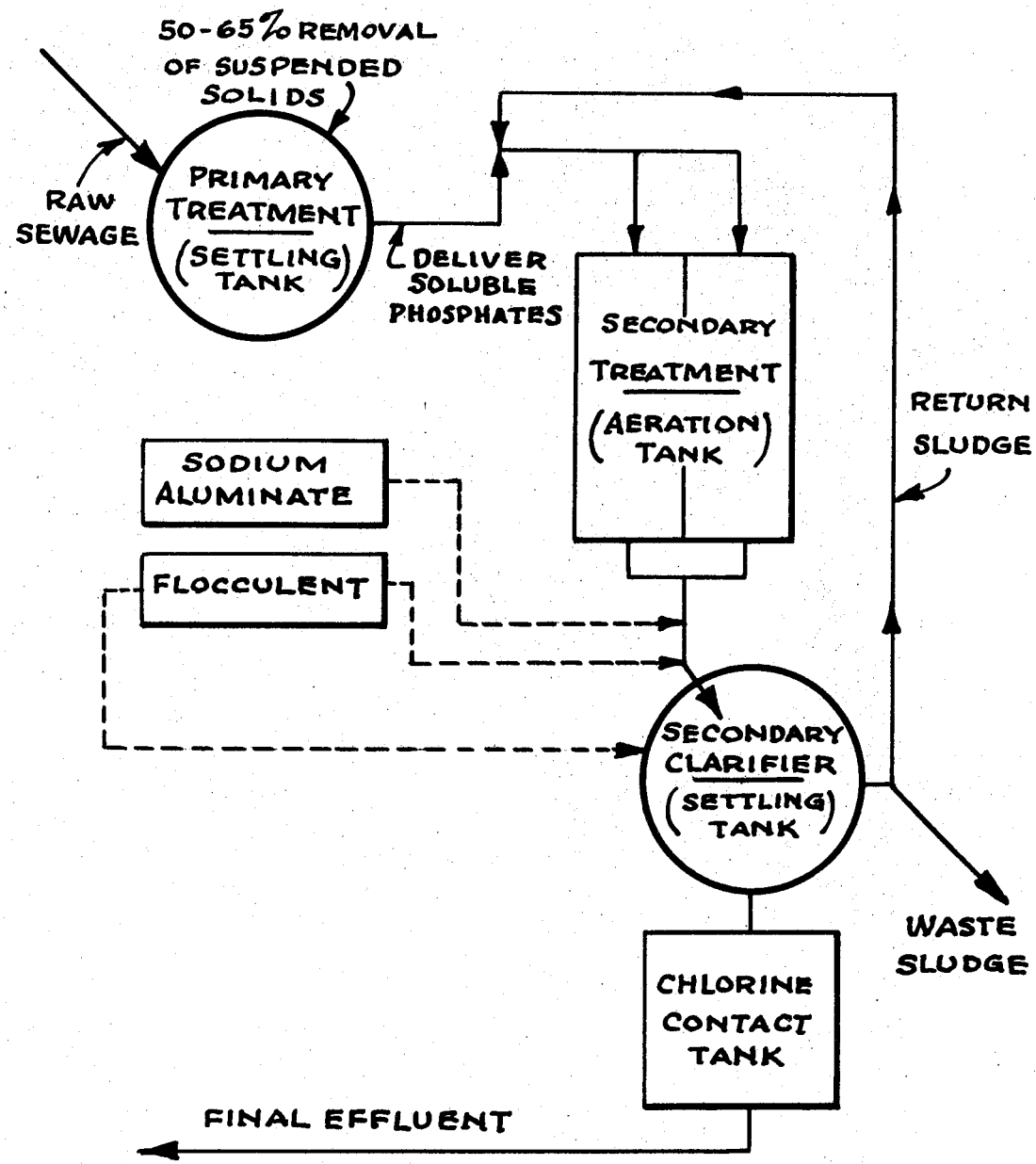
Inventors
Roy D. Sawyer
John D. Tinsley
By Kinzer, Dorn and Zickert
Attorneys

SEWAGE TREATMENT

This application is a continuation-in-part of application Ser. No. 823,518, filed May 9, 1969, and now abandoned.

This invention relates to treatment of sewage effluents and in particular to the removal of soluble phosphates.

Detergents entrained in waste water contribute to the presence of soluble phosphates only recently recognized as nutrients which encourage the proliferation of certain bacteria and biologically primitive vegetation in the body of water which receives the sewage effluent. Such proliferation catastrophically disturbs natural marine ecological balances, producing an environment inimcal to the viability of marine fauna in the effluent-receiving body of water. Indeed, it is calculated by some authorities that the imbalance now prevailing in Lake Erie is biologically irreversible.

Considerable interest is therefore centered on measures susceptible of application at the sewage disposal plant for minimizing the presence of phosphates in sewage effluents, and the primary object of the present invention is to contribute a remedy to this unique form of pollution. More specifically, it is an object of the present invention to reduce phosphates to a tolerable level in a sewage effluent by addition of sodium aluminate and a floculant after the primary treatment thereby precipitating insoluble phosphates. We have found that the phosphates thus precipitated do not tend to leach back to the effluent which is a noticeable circumstance with other treating agents, notably alum and iron salts. Another object is to enable phosphate elimination to be accomplished economically at a very high level of efficiency by combining the sodium aluminate treatment with treatment by a polymeric flocculant (hereinafter referred to as "flocculant") which carries down or helps to settle insolubilized phosphates.

We have found that a practical approach in eliminating undesired phosphate nutrients from a sewage effluent, certainly from the standpoint of economy and predictability, is to add an amount of sodium aluminate at least equal in weight only to the soluble phosphate content of the sewage stream being treated. This treatment with sodium aluminate in itself is effective in eliminating a high percentage of the phosphate content from the effluent; and if at the same time a flocculant be used, phosphate removal is about 97 percent complete.

We recognize that it has heretofore been proposed to insolubilize phosphates in a sewage effluent by treatment with sodium aluminate. While removal was reputed as "good", additional treatment with alum or sulfuric acid in a weight dosage about as much as the sodium salt was required in order to obviate the presence of complex organic phosphates. We have not encountered this difficulty.

Addition of alum as the principal treating agent for phosphate removal has also been proposed, but experience has shown that alum, like iron salts, can itself introduce soluble phosphates or produce reversible systems where the removed phosphates or other equally undesired complexes leach back into the system.

The ordinary sewage plant involves both a primary settling or clarification treatment, where easily settled solids present in the raw sewage are removed by known techniques, and a secondary treatment where bacteria consume a large part of the soluble organic material, again by known techniques. The effluent sewage stream from the primary treatment contains soluble phosphates transmitted to the secondary treatment equipment, and the resultant stream of effluent from the secondary treatment is ordinarily discharged directly to the receiving body of water where the pollution problem is encountered. Some sewage treatment plants also effect a tertiary stage of treatment, prior to discharging an effluent to the natural body of water.

Under the present invention, sodium aluminate and a flocculant which occludes insolubilized phosphates are preferably introduced into the secondary effluent; the flocculant should not be exposed to severe mechanical agitation likely to produce physical disintegration and thereby interfere with the ability of the flocculant to effectively trap the insolubilized phosphates. The preferred flocculants are anionic water soluble polymeric flocculants.

THE ANIONIC WATER SOLUBLE POLYMERS

The anionic water soluble polymers used in the practice of the invention are formed by the polymerization of at least one mono-olefinic compound through an aliphatic unsaturated group. The polymers may be either copolymers or homopolymers and should have as a minimum molecular weight of at least 100,000. In a preferred practice of the invention, the molecular weight of these polymers is at least 1,000,000 with molecular weights in excess of 1,000,000 also being suitable for use. In most cases the upper practical molecular weight limit is about 30,000,000.

The anionic water soluble polymers of the type generically described are composed of at least 10 percent by weight of at least one monomer which contains an anionic hydrophilic side chain group. Thus the polymers may be said to contain in a side chain grouping such anionic radicals as carboxylic acid, carboxylic anhydride groups, carboxylic acid salt groups, sulfonic acid groups, phosphonus and phosphonic acid and salt groupings.

The most readily prepared polymers that give the best results are the copolymers and homopolymers of acrylic acid which contain at least 10 percent by weight of acrylic acid or acrylic acid salts.

A particularly useful group of copolymer of acrylic acids are those which contain 20–60 percent by weight of acrylic acid, and from 40–80 percent by weight of acrylamid with such polymers having a preferred molecular weight range between 1,000,000–3,000,000. To illustrate preparation of a typical polymer of acrylamid and acrylic acid, the following is presented by way of example.

EXAMPLE I

This example illustrates preparation of a copolymer comprised of 30 percent sodium acrylate monomer and 70 percent acrylamide.

27 parts by weight of acrylic acid was dissolved in 72 parts of water and cooled to a temperature below 35°C. The above solution temperature was maintained while neutralization with sodium hydroxide was effected. Addition of 30 parts by weight of a 50 percent solution of sodium hydroxide was necessary to carry out this step. A solution pH of 7–9 was reached after neutralization.

63 parts by weight of acrylamide were then added to the above solution and mixed until dissolved at a solution temperature of 20–30° C. 33 additional parts by weight of water were added and the pH of the monomer solution adjusted to 8.5. 0.8 part of a 1 percent solution of potassium persulfate were added with stirring to the monomer solution. This was followed by addition of 3.2 parts of a 1 percent solution of sodium metabisulfite. Into the reaction vessel itself was added 575.0 parts by weight of toluene and 19.6 parts by weight of sorbitan monooleate nonionic emulsifier. To the toluene solution was added the monomer solution containing catalyst and the temperature increased to 75° C.

The reaction vessel was purged with nitrogen and an exothermic reaction was then initiated. After the exothermic reaction ceased, the mixture was cooled at 63° C., and additional catalyst added. Specifically, 15.6 parts of a 1.15 percent solution of azobisisobutyronitrile in toluene were added to the reaction mixture. The nitrogen purge was continued and the temperature held at 63° C., until another exothermic reaction was completed (approximately 30 minutes after initiation). After the second exothermic reaction, water was distilled off by azeotropic distillation, and the solid product isolated by filtration. A 1 percent solution of the final copolymeric composition had a viscosity of 22,500 cps. The molecular weight of this polymer was slightly greater than 1,000,000.

Thus, the preferred polymers of the invention are prepared from monomers having the molecular grouping:

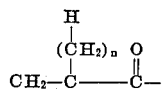

wherein *n* is an integer from 0 to 1 inclusive.

Another useful group of polymers of anionic copolymers whose starting monomers contain the grouping:

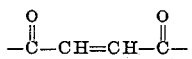

Illustrative of such polymers are copolymers of maleic anhydride, amaleic acid, fumaric acid, itaconic acid, aconitic acid, citraconic acid, the partial amides of these acids, the alkali metal (e.g. sodium, potassium and lithium), the alkaline earth metal (e.g. magnesium, calcium, barium and strontium), and ammonium salts of these acids, the partial alkyl esters (e.g. methyl, ethyl, propyl, butyl, mono esters), the salts of said partial alkyl esters, and the partial substituted amides of these polycarboxylic acids. Where the hydrophilic maleic acid derivatives are used as one of the starting components to form the copolymer, the hydrophobic comonomers may be, for example, styrene, alphamethylstyrene, vinyl toluene, chlorostyrene, vinyl acetate, vinyl chloride, vinyl formate, vinyl alkyl ethers, alkyl acrylates, alkyl methacrylates, ethylene, propylene, and/or isobutylene.

Other polymers that may be employed are those polymers which contain in a side chain grouping, a sulfonic, phosphonic or phosphonus acid grouping, either as the free acid or in the form of a water-soluble cation salt. Illustrative are the well known polystyrene sulfonic acids. Also illustrative are the phosphorolated polystyrenes.

In certain instances it is possible to use homo or copolymers of acrylamides which are not, per se, anionic, but under certain conditions of pH are capable of being hydrolized to convert the amide grouping into a carboxylic acid salt grouping, thereby rendering the starting polymer anionic under conditions of use.

To further illustrate typical polymers useful in the practices of the invention, Table A is presented below:

TABLE A

| Number | Name | Characteristic grouping |
|---|---|---|
| 1 | Polyacrylate-sodium salt. | —CH₂—CH—<br>COO⁽⁻⁾ Na⁽⁺⁾ |
| 2 | Polymethacrylic acid-sodium salt. | —CH₂—C(CH₃)—<br>COO⁽⁻⁾ Na⁽⁺⁾ |
| 3 | Maleic anhydride-vinyl acetate copolymer. | —CH—CH₂—CH——CH—<br>O   O=C   C=O<br>CH₃C=O    O |
| 4 | Polyvinyl methyl ether-maleic anhydride copolymer. | —CH—CH₂—CH——CH—<br>OCH₃ O=C   C=O<br>O |
| 5 | Methacrylic acid-acrylamide copolymer. | CH₃  CH₃<br>—CH₂C—CH₂—C—<br>COO⁽⁻⁾  CONH₂<br>H⁽⁺⁾ |
| 6 | Polyacrylic acid. | —CH₂—CH—<br>COO⁽⁻⁾ H⁽⁺⁾ |
| 7 | Isopropenyl acetate-maleic anhydride sodium salt. | CH₃<br>CH₂—C——CH——CH<br>O    C=O  C=O<br>CH₂C=O O⁽⁻⁾ O⁽⁻⁾<br>Na⁽⁺⁾ Na⁽⁺⁾ |
| 8 | Itaconic acid-vinyl. | COO(—)H(+)<br>—C—CH₂——CH₂—CH—<br>CH₂COO(—)   O<br>H⁽⁺⁾  CH₃C=O |
| 9 | Methyl styrene-maleic anhydride sodium salt. | CH₃<br>C—CH₂—CH——CH<br>(phenyl)  COO(—) COO(—)<br>Na⁽⁺⁾ Na⁽⁺⁾ |
| 10 | Styrene-maleic anhydride. | CH  CH₂ CH  CH<br>(phenyl)    COO(—)COO(—)<br>Na⁽⁺⁾ Na⁽⁺⁾ |
| 11 | Methylmethacrylate-maleic anhydride sodium salt. | CH₃<br>C——CH₂—CH————CH<br>COOCH₃ COO(—) COO(—)<br>Na⁽⁺⁾ Na⁽⁺⁾ |
| 12 | Acrylic acid. | —CH—CH₂—CH—CH₂<br>(phenyl)    COO(—)<br>H(+) |

Also see the disclosures and discussions of anionic polymers appearing in U.S. Pat. No. 3,377,274 and U.S. Pat. No. 3,374,143 which are incorporated herein by reference.

The polymers of the invention are most suitably used in the form of dilute aqueous solutions whose solution strength ranges between 0.1–5 percent by weight. Such solutions are prepared in separate mixing vessels and then used to treat the aqueous suspensions described.

The polymers are used at a dosage within the range of 0.01 parts per million up to dosages not greater than 100 parts per million. In most cases excellent results are obtained when the dosage of the polymer is within the range of 0.05–5 parts per million. The dosage levels specified are based on the total system rather than upon the suspended solids present in the system.

It may also be observed that delivery of an effluent or partially purged sewage stream to the secondary treatment equipment, free or essentially free of soluble phosphates, is not always desirable, inasmuch as some soluble phosphate content in the thus-delivered effluent may be used as a source of nutrient for the bacteria used in the secondary treatment to consume soluble organics as an incident to further, and in most instances, the final purification step.

In view of the foregoing, the invention is best practiced by adding the flocculant at a relatively quiet stage of treatment, say at the so-called center well of the secondary settling tank, and adding the sodium aluminate to the secondary effluent. This is explained by observing that the flocculant is to encourage removal or precipitation of inSolubilized phosphates and its physical integrity as a particle or agglomerate should not be significantly impaired by mechanical agitation.

Table 1 below presents significant data obtained at a municipal sewage treatment plant involving treatment at the primary stage, which induced further work as will be explained.

TABLE 1
[Treatment at the primary stage (plant) 500 ml. samples]

| Run | Amount of additive (p.p.m.) | | Analysis (p.p.m. in supernatant) | | Percent removal |
|---|---|---|---|---|---|
| | NaAlO₂ | Flocculant* | Unfiltered total PO₄ | Filtered PO₄ | |
| First day | | | ¹8.9 | ¹4.1 | |
| | 1.5 | | 2.5 | | 72 |
| | 2.0 | | 2.3 | | 74 |
| | 2.85 | | 2.2 | | 75 |
| | 4.0 | | 1.9 | 1.5 | 79 |
| | 4.0 | 0.2 | 1.1 | | 88 |
| | | 0.2 | 4.5 | | 50 |

Comment: Colloidal supension; pH 7.5

| Second day | | | ¹47 | ¹9.6 | |
|---|---|---|---|---|---|
| | 2.88 | | 9.2 | | 81 |
| | 4.8 | | 8.2 | | 83 |
| | 6.7 | | 7.3 | | 85 |
| | 9.6 | | 4.6 | 2.9 | 91 |

Comment: Colloidal suspension; pH 7.3

| Third day | | | ¹69 | ¹12.9 | |
|---|---|---|---|---|---|
| | 3.87 | 0.1 | 2.3 | | 96.7 |
| | 6.45 | 0.1 | 2.1 | | 97.0 |
| | 9.7 | 0.1 | 1.5 | | 97.8 |
| | 12.9 | 0.1 | 1.3 | 1.0 | 98.2 |

Comment: Excellent clarity; pH 7.1

| Fourth day | | | ¹39 | ¹6.9 | |
|---|---|---|---|---|---|
| | 2.07 | 0.1 | 7.0 | | 82 |
| | 3.45 | 0.1 | 5.8 | | 85 |
| | 5.17 | 0.1 | 5.0 | | 87 |
| | 6.9 | 0.1 | 4.0 | 2.4 | 90 |

¹ Start.
* Acrylamide plus 50% acrylic acid copolymer M.W.>1,000,000.

In Table 1, the unfiltered analysis represents the total phosphate content of the raw sewage stream to be subjected to treatment at the primary stage, both soluble and insoluble phosphates. The filtered analysis represents the soluble phosphate content only which, if not removed, is in the sewage effluent stream delivered to the secondary stage of treatment where bacteria attack on the effluent occurs.

The data in Table 1 in some respects establish disadvantages in working at the primary level of the sewage treatment plant, at least in terms of soluble phosphate removal. Most likely the difficulty is presented by a high level of total impurities which interfere with insolubilizing contact between the PO₄ ions and the aluminum ions.

The third day run (Table 1) was remarkable, in that phosphate removal was better than 98 percent, when the dosage of sodium aluminate (flocculant-supported) was exactly equal to the weight of PO₄ presented by the soluble phosphates; yet this effect was not duplicated the following day, even through the soluble phosphate content at the initial level (6.9:39) was almost the same as on the previous day (12.9:69). Nonetheless, the advantage of using the flocculant (shown in Table 1) was obvious in the first day run; it accounted for removal of nearly 50 percent (4.4 parts by weight in a total of 8.9) of the phosphates, which of course would have been the suspended or unsettled insoluble phosphates entrained in the raw sewage. In fact, the effect of the flocculant was demonstrated twice on the first day run, Table 1.

In any event, the high dosage of sodium aluminate required at the primary stage of treatment, coupled with a realization of the advantage of feeding soluble phosphates to the bacteria at the secondary stage of treatment, induced field work at the secondary level of the same sewage disposal plant with the following results set forth in Table 2.

TABLE 2

Treatment of the Secondary Effluent (See FIG. 1) (Aeration Inlet - 4 gal. sample)

| AMOUNT (ppm) | | ANALYSIS (ppm) | | |
|---|---|---|---|---|
| NaAlO₂ | Flocculant | Unfiltered Total PO₄ | Filtered PO₄ | % Removal* |

Table 2 — Continued

| | | 15.0 | 2.3 | |
|---|---|---|---|---|
| 2.3 | 0.1 | 0.45 | | 97%* |

*(15.0 - 0.45/15 × 100)

Further tests on the sewage stream at the secondary effluent level revealed consistently high phosphate removal with low, economically feasible dosages of sodium aluminate in conjunction with only 0.1 parts per million of the flocculant. As noted above, the amount of flocculant is based on the total system, which is the volumetric amount of sewage delivered for treatment. This is a matter of convenience and assures an effective amount of flocculant. It is therefore possible under the present invention to simply analyze fOr soluble phosphate in the effluent discharged at the secondary treatment level and then add to this secondary effluent an amount of sodium aluminate at least equal to the analyzed weight of the phosphate radical per unit volume of secondary effluent in conjunction with the flocculant which entrains and settles the resultant insoluble phosphate substantially at the rate of formation. Of course, as a precaution, one could analyze the primary effluent for phosphate content and add a like weight of sodium aluminate which could amount to over-treatment in view of the soluble phosphates which may be devoured by bacteria at the secondary level.

We have determined that as little as 0.01 parts per million of flocculant added to the sewage stream may be enough, and in this regard it will be appreciated that the volume of the sewage stream being treated per unit of time may vary from day to day.

As noted above, the flocculant should be added at a location where there is little mechanical agitation, and attention is therefore diverted to FIG. 1 presenting a flow chart of a typical sewage plant. Most of the legends are self-explanatory, and therefore we only emphasize that the flocculant is preferably introduced directly into the secondary settling tank as for example at the "center well" structure, although the flocculant may be optionally metered into the pipe or conduit which feeds the secondary effluent to the secondary settling tank. The sodium aluminate is preferably introduced into the same conduit, but optionally it may be added directly to the secondary settling tank.

Stated somewhat differently, the preferred mode of practice is that the sodium aluminate is introduced first into the conduit which delivers the secondary effluent to the secondary settling tank; afterwards the flocculent is added, where there is substantially no mechanical agitation and before the secondary effluent moves downstream beyond the center well. Thus, the flocculent may be added to the secondary effluent at the center well, or in between the center well and the point where insolubilization by sodium aluminate addition occurs. Some plants have a tertiary stage before the final outfall, and our invention may be practiced at this stage which is sufficiently quiet to avoid physical fracture of the flocculant, and which would be receiving the secondary effluent and discharging a (further purified) secondary effluent as can be well appreciated.

By separate testing we determined that there is no leaching of soluble phosphate from the precipitated sewage effluents treated under the present invention.

It is to be understood that so far as concerns the addition of sodium aluminate to a secondary effluent, the practice of this invention may be imposed at sewage plants where there is a tertiary treatment (further purification of the secondary effluent) because tertiary treatment is imposed on the secondary effluent by definition.

We claim:
1. In a sewage treatment process where a stream of raw sewage containing soluble phosphates is subjected to settlement of solids at a primary state of treatment, resulting in a partially purged effluent to be subjected downstream to further pruification treatment including bacterial destruction of soluble organics which produces a secondary effluent delivered through a conduit to a secondary tank for further clarification, and wherein the secondary settling tank has a center well, a method for reducing the soluble phosphate content in the secondary effluent comprising:

a. adding to the conduit which delivers the secondary effluent sodium aluminate in a weight amount at least about equal to the weight of the phosphate radical presented by the soluble phosphate content per unit volume of the secondary effluent;

b. and before the secondary effluent moves downstream beyond the center well, adding a flocculent to the secondary effluent containing the sodium aluminate to entrain and settle the insoluble phosphate;

c. the flocculent being added while avoiding mechanical agitation, and said flocculent being a water soluble polymer selected from the group consisting of acrylic acid, acrylamide andpolycarboxylic acid anionic polymers.

2. A method according to claim 1 wherein the flocculent is added at the center well.

3. A method according to claim 1 wherein the flocculent is added at a point between the center well and the point where insolubilization by sodium aluminate occurs.

* * * * *